(12) United States Patent
Prokop et al.

(10) Patent No.: US 8,462,614 B2
(45) Date of Patent: *Jun. 11, 2013

(54) BUFFER-BASED GENERATION OF OVSF CODE SEQUENCES

(75) Inventors: Tomasz Prokop, San Jose, CA (US); Gongyu Zhou, North Epping (AU)

(73) Assignee: Agere Systems LLC, Allentown, PA (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/009,044

(22) Filed: Jan. 19, 2011

(65) Prior Publication Data

US 2011/0110399 A1 May 12, 2011

Related U.S. Application Data

(63) Continuation of application No. 11/209,421, filed on Aug. 23, 2005, now Pat. No. 7,894,327.

(51) Int. Cl.
*H04J 11/00* (2006.01)
*H04L 27/26* (2006.01)

(52) U.S. Cl.
CPC .................................. *H04L 27/2662* (2013.01)
USPC .......................................................... 370/208

(58) Field of Classification Search
USPC .................. 370/208, 209, 320, 335, 342, 441
See application file for complete search history.

(56) References Cited

U.S. PATENT DOCUMENTS

| | | | | |
|---|---|---|---|---|
| 6,041,034 A * | 3/2000 | Fukumasa et al. | ............ | 370/203 |
| 6,222,875 B1 * | 4/2001 | Dahlman et al. | .............. | 375/130 |
| 6,526,065 B1 * | 2/2003 | Cheng | .......................... | 370/441 |
| 6,552,996 B2 * | 4/2003 | Kim et al. | ...................... | 370/209 |
| 6,646,579 B2 * | 11/2003 | Doetsch et al. | ............... | 370/441 |
| 6,747,947 B2 | 6/2004 | Kim et al. | | |
| 6,956,948 B1 * | 10/2005 | Hwang et al. | ................... | 380/46 |
| 7,239,604 B2 | 7/2007 | Kim et al. | | |
| 7,289,426 B2 * | 10/2007 | Pappalardo et al. | .......... | 370/208 |
| 7,586,835 B2 * | 9/2009 | Lee et al. | ...................... | 370/209 |
| 7,765,456 B1 | 7/2010 | Lilliott et al. | | |
| 7,894,327 B2 * | 2/2011 | Prokop et al. | ................. | 370/208 |
| 2002/0006156 A1 * | 1/2002 | Belaiche | ........................ | 375/130 |
| 2003/0105532 A1 * | 6/2003 | Doetsch et al. | ................... | 700/1 |
| 2003/0108024 A1 * | 6/2003 | Kang | ........................... | 370/342 |
| 2005/0237919 A1 | 10/2005 | Pettendorf et al. | | |
| 2007/0171812 A1 | 7/2007 | Kim et al. | | |
| 2009/0135788 A1 | 5/2009 | Zuniga et al. | | |

OTHER PUBLICATIONS

Non-Final Office Action received in U.S. Appl. No. 11/209,421, filed Aug. 23, 2005 dated Jan. 25, 2010.

(Continued)

*Primary Examiner* — Ricky Ngo
*Assistant Examiner* — Phuongchau B Nguyen
(74) *Attorney, Agent, or Firm* — Mendelsohn, Drucker & Associates, P.C.; Kevin M. Drucker; Steve Mendelsohn

(57) ABSTRACT

In one embodiment, a buffer-based method for generating codes (such as Orthogonal Variable Spreading Factor (OVSF) codes) for spreading and despreading data, without using a chip-rate counter. First, a buffer is populated with initial values based on a received spreading factor and desired code index. Next, a timing strobe is received, and the values in the buffer are changed upon receipt of the timing strobe based on an algorithm that is independent of any count value associated with the timing strobe. Finally, a code sequence value is generated based on the values in the buffer.

29 Claims, 10 Drawing Sheets

OTHER PUBLICATIONS

Final Offcie Action received in U.S. Appl. No. 11/209,421, filed Aug. 23, 2005 dated Jul. 7, 2010.

Notice of Allowability received in U.S. Appl. No. 11/209,421, filed Aug. 23, 2005 dated Jan. 12, 2011.

* cited by examiner

FIG. 4A

BEGIN
ITERATION 1

| SP | STACK LEVEL | n | s | c | k | VALUES ASSERTED |
|---|---|---|---|---|---|---|
| → | 0 | 4 | 0 | 0 | 9 | |

ITERATION 2

| SP | STACK LEVEL | n | s | c | k | VALUES ASSERTED |
|---|---|---|---|---|---|---|
| | 0 | 4 | 0 | 0 | 9 | |
| → | 1 | 3 | 0 | 0 | 4 | |

ITERATION 3

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| → | 2 | 2 | 0 | 0 | 2 | |

ITERATION 4

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| → | 3 | 1 | 0 | 0 | 1 | |

ITERATION 5

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| | 3 | 1 | 0 | 0 | 1 | |
| → | 4 | 0 | 0 | 0 | 0 | +1 |

ITERATION 6

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| | 3 | 1 | 0 | 0 | 1 | |
| → | 4 | 0 | 1 | 1 | 0 | |

ITERATION 7

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| | 3 | 1 | 0 | 0 | 1 | |
| → | 4 | 0 | 1 | 1 | 0 | -1 |

ITERATION 8

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| → | 3 | 1 | 0 | 1 | 1 | |

ITERATION 9

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| | 3 | 1 | 0 | 1 | 1 | |
| → | 4 | 0 | 0 | 0 | 0 | +1 |

ITERATION 10

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| | 3 | 1 | 0 | 1 | 1 | |
| → | 4 | 0 | 0 | 1 | 0 | |

ITERATION 11

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| | 3 | 1 | 0 | 1 | 1 | |
| → | 4 | 0 | 1 | 1 | 0 | -1 |

ITERATION 12

| SP | STACK LEVEL | n | s | c | k | VALUES ASSERTED |
|---|---|---|---|---|---|---|
| | 0 | 4 | 0 | 0 | 9 | |
| | 1 | 3 | 0 | 0 | 4 | |
| | 2 | 2 | 0 | 0 | 2 | |
| → | 3 | 1 | 0 | 1 | 1 | |

FIG. 4B

ITERATION 13

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
| → | 2 | 2 | 0 | 1 | 2 |  |

ITERATION 14

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
| → | 3 | 1 | 0 | 0 | 1 |  |

ITERATION 15

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
|  | 3 | 1 | 0 | 0 | 1 |  |
| → | 4 | 0 | 0 | 0 | 0 | +1 |

ITERATION 16

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
|  | 3 | 1 | 0 | 0 | 1 |  |
| → | 4 | 0 | 1 | 1 | 0 |  |

ITERATION 17

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
|  | 3 | 1 | 0 | 0 | 1 |  |
| → | 4 | 0 | 1 | 1 | 0 | -1 |

ITERATION 18

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
| → | 3 | 1 | 0 | 0 | 1 |  |

ITERATION 19

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
| → | 3 | 1 | 0 | 1 | 1 |  |

ITERATION 20

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
|  | 3 | 1 | 0 | 1 | 1 |  |
| → | 4 | 0 | 0 | 0 | 0 |  |

ITERATION 21

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
|  | 3 | 1 | 0 | 1 | 1 |  |
| → | 4 | 0 | 0 | 0 | 0 | +1 |

ITERATION 22

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
|  | 3 | 1 | 0 | 1 | 1 |  |
| → | 4 | 0 | 1 | 1 | 0 |  |

ITERATION 23

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
| → | 3 | 1 | 0 | 1 | 1 |  |
|  | 4 | 0 | 1 | 1 | 0 | -1 |

ITERATION 24

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
|  | 2 | 2 | 0 | 1 | 2 |  |
| → | 3 | 1 | 0 | 1 | 1 |  |

FIG. 4C

ITERATION 25

| SP | STACK LEVEL | n | s | c | k | VALUES ASSERTED |
|---|---|---|---|---|---|---|
|  | 0 | 4 | 0 | 0 | 9 |  |
|  | 1 | 3 | 0 | 0 | 4 |  |
| → | 2 | 2 | 0 | 1 | 2 |  |

ITERATION 26

| SP | STACK LEVEL | n | s | c | k | VALUES ASSERTED |
|---|---|---|---|---|---|---|
|  | 0 | 4 | 0 | 0 | 9 |  |
| → | 1 | 3 | 1 | 1 | 4 |  |

ITERATION 27

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
| → | 2 | 0 | 0 | 0 | 0 |  |

ITERATION 28

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
| → | 2 | 2 | 1 | 0 | 2 |  |

ITERATION 29

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
| → | 3 | 0 | 0 | 0 | 0 |  |

ITERATION 30

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
| → | 3 | 1 | 1 | 0 | 1 |  |

ITERATION 31

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 0 | 1 |  |
| → | 4 | 0 | 0 | 0 | 0 |  |

ITERATION 32

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 0 | 1 |  |
| → | 4 | 0 | 1 | 0 | 0 |  |

ITERATION 33

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 0 | 1 |  |
| → | 4 | 0 | 1 | 0 | 0 | −1 |

ITERATION 34

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 0 | 1 |  |
| → | 4 | 0 | 0 | 1 | 0 |  |

ITERATION 35

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 0 | 1 |  |
| → | 4 | 0 | 0 | 1 | 0 | +1 |

ITERATION 36

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
| → | 3 | 1 | 1 | 0 | 1 |  |

ITERATION 37

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
| → | 3 | 1 | 1 | 1 | 1 |  |

FIG. 4D

ITERATION 38

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 1 | 1 |  |
| → | 4 | 0 | 0 | 0 | 0 |  |

ITERATION 39

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
| → | 3 | 1 | 1 | 1 | 1 |  |
|  | 4 | 0 | 1 | 0 | 0 |  |

ITERATION 40

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 1 | 1 |  |
| → | 4 | 0 | 1 | 0 | 0 | -1 |

ITERATION 41

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 1 | 1 |  |
| → | 4 | 0 | 0 | 1 | 0 |  |

ITERATION 42

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
|  | 3 | 1 | 1 | 1 | 1 |  |
| → | 4 | 0 | 0 | 1 | 0 | +1 |

ITERATION 43

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
| → | 3 | 1 | 1 | 1 | 1 |  |

ITERATION 44

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 0 | 2 |  |
| → | 3 | 1 | 1 | 1 | 1 |  |

ITERATION 45

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
| → | 2 | 2 | 1 | 0 | 2 |  |

ITERATION 46

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
| → | 2 | 2 | 1 | 1 | 2 |  |

ITERATION 47

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 1 | 2 |  |
| → | 3 | 1 | 1 | 0 | 1 |  |

ITERATION 48

| SP | STACK LEVEL | n | s | c | k | VALUES ASSERTED |
|---|---|---|---|---|---|---|
|  | 0 | 4 | 0 | 0 | 9 |  |
|  | 1 | 3 | 1 | 1 | 4 |  |
|  | 2 | 2 | 1 | 1 | 2 |  |
|  | 3 | 1 | 1 | 0 | 1 |  |
| → | 4 | 0 | 1 | 0 | 0 |  |

FIG. 4E

ITERATION 51

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| | 3 | 1 | 1 | 0 | 1 | |
| → | 4 | 0 | 1 | 0 | 0 | -1 |

ITERATION 52

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| | 3 | 1 | 1 | 0 | 1 | |
| → | 4 | 0 | 0 | 1 | 0 | |

ITERATION 53

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| | 3 | 1 | 1 | 0 | 1 | |
| → | 4 | 0 | 0 | 1 | 0 | +1 |

ITERATION 54

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| → | 3 | 1 | 1 | 0 | 1 | |

ITERATION 55

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| → | 3 | 1 | 1 | 1 | 1 | |

ITERATION 56

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| → | 3 | 1 | 1 | 1 | 1 | |

ITERATION 57

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| → | 3 | 1 | 1 | 1 | 1 | |
| | 4 | 0 | 1 | 0 | 0 | |

ITERATION 58

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| | 3 | 1 | 1 | 1 | 1 | |
| → | 4 | 0 | 1 | 0 | 0 | -1 |

ITERATION 59

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| | 3 | 1 | 1 | 1 | 1 | |
| → | 4 | 0 | 0 | 1 | 0 | |

ITERATION 60

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| | 3 | 1 | 1 | 1 | 1 | |
| → | 4 | 0 | 0 | 1 | 0 | +1 |

ITERATION 61

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| | 2 | 2 | 1 | 1 | 2 | |
| → | 3 | 1 | 1 | 1 | 1 | |

ITERATION 62

| SP | STACK LEVEL | n | s | c | k | VALUES ASSERTED |
|---|---|---|---|---|---|---|
| | 0 | 4 | 0 | 0 | 9 | |
| | 1 | 3 | 1 | 1 | 4 | |
| → | 2 | 2 | 1 | 1 | 2 | |

ITERATION 63

| SP | STACK LEVEL | n | s | c | k | VALUES ASSERTED |
|---|---|---|---|---|---|---|
| | 0 | 4 | 0 | 0 | 9 | |
| → | 1 | 3 | 1 | 1 | 4 | |

ITERATION 64

| SP | STACK LEVEL | n | s | c | k | VALUES ASSERTED |
|---|---|---|---|---|---|---|
| → | 0 | 4 | 0 | 0 | 9 | |

END

US 8,462,614 B2

BUFFER-BASED GENERATION OF OVSF CODE SEQUENCES

CROSS-REFERENCE TO RELATED APPLICATION

This application is a continuation of U.S. application Ser. No. 11/209,421, filed on Aug. 23, 2005, the teachings of which are incorporated herein by reference.

BACKGROUND OF THE INVENTION

1. Field of the Invention

The present invention relates to (wireless) receivers, and, in particular, to buffer-based methods for generating Orthogonal Variable Spreading Factor (OVSF) codes for the spreading and despreading of data.

2. Description of the Related Art

When a signal travels through a real-world environment, it often reaches a receiver by multiple paths. These paths occur as a result of the signal reflecting, diffracting, and scattering from various elements in the environment, e.g., mountains, trees, and buildings. Multi-path components are essentially time-delayed variants of a single signal. While, in some applications, these multiple components may result in interference, e.g., ghosting on the display of an analog television receiver, Code Division Multiple Access (CDMA) systems intentionally make use of these multiple components.

The basic principle of CDMA systems is orthogonal coding, whereby, instead of assigning specific frequencies or time slots to each user of a system, the users are distinguished from one another by assigning codes. The codes fulfill the same role as frequency or time in frequency- or time-division systems, i.e., to keep the signals for different users from interfering with one another. In orthogonal spreading, a symbol is XOR-multiplied by a defined sequence of bits called a "code sequence" (also called a "code pattern" or simply a "code"). If the code sequence length is n bits, then each symbol is transformed to n so-called chips. The resulting chip rate, i.e., the number of chips per second (e.g., bits per second), is n times the original symbol rate (number of symbols per second). For example, the spreading code sequence 1111 has a length, also called a spreading or spread factor (SF) or Orthogonal Variable Spreading Factor (OVSF), of four. A single 1 will be spread to the sequence 0000 (1 XOR'ed with 1 gives 0), and a single 0 will be spread to the sequence 1111. In general, code sequences are not arbitrarily chosen, but rather, selected according to certain mathematical rules that provide sets of code sequences that are orthogonal to each other. Orthogonal code sequences have no correlation. Consequently, signals spread with code sequences that are orthogonal to each other do not interfere with one another. For a single connection, input data is spread with a particular code sequence at the transmitter end. To recover the data, the same orthogonal code sequence is used at the receiver end to despread the signal.

Implementation of OVSF spreading and/or despreading operations in a transmitter and/or receiver requires the generation of OVSF codes. The most common and widely used solution requires a chip-rate counter to drive an OVSF generation circuit. The OVSF generation circuit performs an XOR operation between the current count from the chip-rate counter and the OVSF code index in reverse order to produce an OVSF sequence bit every cycle.

However, there is a need for an OVSF code generator that is not limited by the constraints imposed by the use of a chip-rate counter (where count values are used in an algorithm for generating OVSF code sequences), e.g., to be able to generate OVSF codes asynchronously with respect to a chip counter.

SUMMARY OF THE INVENTION

The present invention provides buffer-based methods for generating OVSF code sequences without using a chip-rate counter.

In one embodiment, the present invention provides a method of generating a code sequence. The method comprises populating at least one buffer with initial values based on a received spreading factor and desired code index; receiving a timing strobe; changing the values in the at least one buffer upon receipt of the timing strobe based on an algorithm that is independent of any count value associated with the timing strobe; and outputting at least one code sequence value based on the values in the at least one buffer.

In another embodiment, the present invention provides an apparatus for generating a code sequence. The apparatus comprises means for populating at least one buffer with initial values based on a received spreading factor and desired code index; means for receiving a timing strobe; means for changing the values in the at least one buffer upon receipt of the timing strobe based on an algorithm that is independent of any count value associated with the timing strobe; and means for outputting at least one code sequence value based on the values in the at least one buffer.

BRIEF DESCRIPTION OF THE FIGURES

Other aspects, features, and advantages of the present invention will become more fully apparent from the following detailed description, the appended claims, and the accompanying drawings in which like reference numerals identify similar or identical elements.

FIG. 4 is a set of stack diagrams illustrating graphically the contents of the stack in an exemplary code sequence generation consistent with the flowchart of FIG. 3;

DETAILED DESCRIPTION

Figure 1:
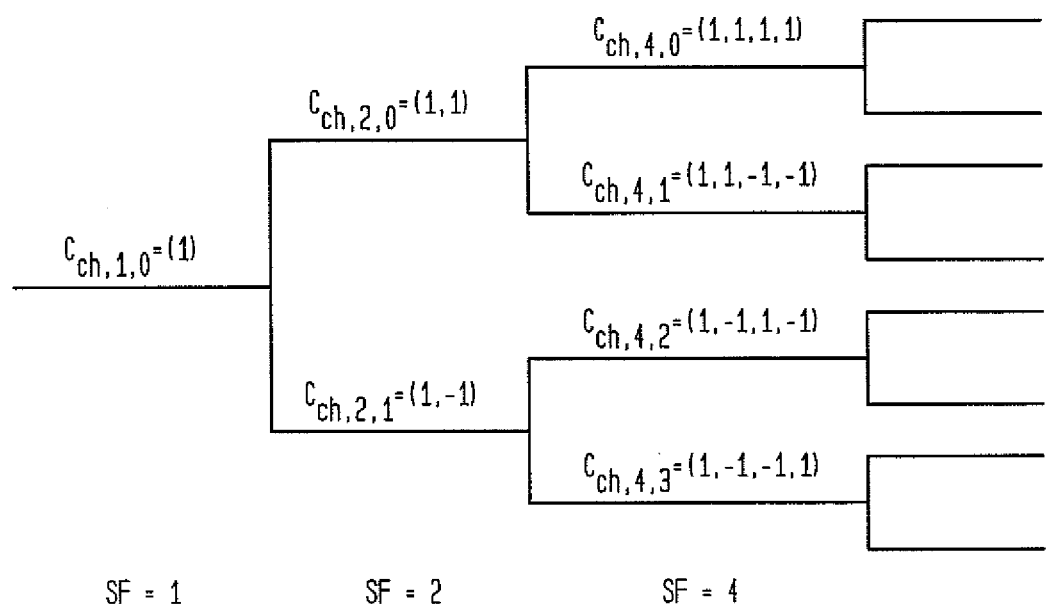
FIG. 1 is a portion of a code tree from which OVSF codes for Third-Generation Partnership Project's Universal Mobile Telecommunications System (3GPP/UMTS) applications are selected.

FIG. 1 is a portion of a code tree from which OVSF codes for Third-Generation Partnership Project's Universal Mobile Telecommunications System (3GPP/UMTS) applications are selected. While the portion of the tree shown in FIG. 1 shows a pattern of codes for only spread factors 1, 2, and 4, the full tree (not shown) extends to code patterns for a spread factor of up to 512. In the code tree, the codes are uniquely identified as $C_{ch,SF,k}$, where SF is the spread factor of the code and k is the code index, $0 \leq k \leq SF-1$. The 3GPP standard specifies that the code generator should be capable of producing codes with a variable spread factor over the range SF=4 to 512. (It should be understood that the invention may also have utility with non-3GPP applications, i.e., SF can be less than 4 or greater than 512.) Accordingly, in the embodiments described below, a maximum of 9 bits is needed to represent code index (or "code number") k for all possible spread factors in the range SF=4 to 512. It should be noted that the set of possible code values {−1,1} is sometimes mapped to {1,0} herein to simplify calculation and binary processing.

Figure 2:
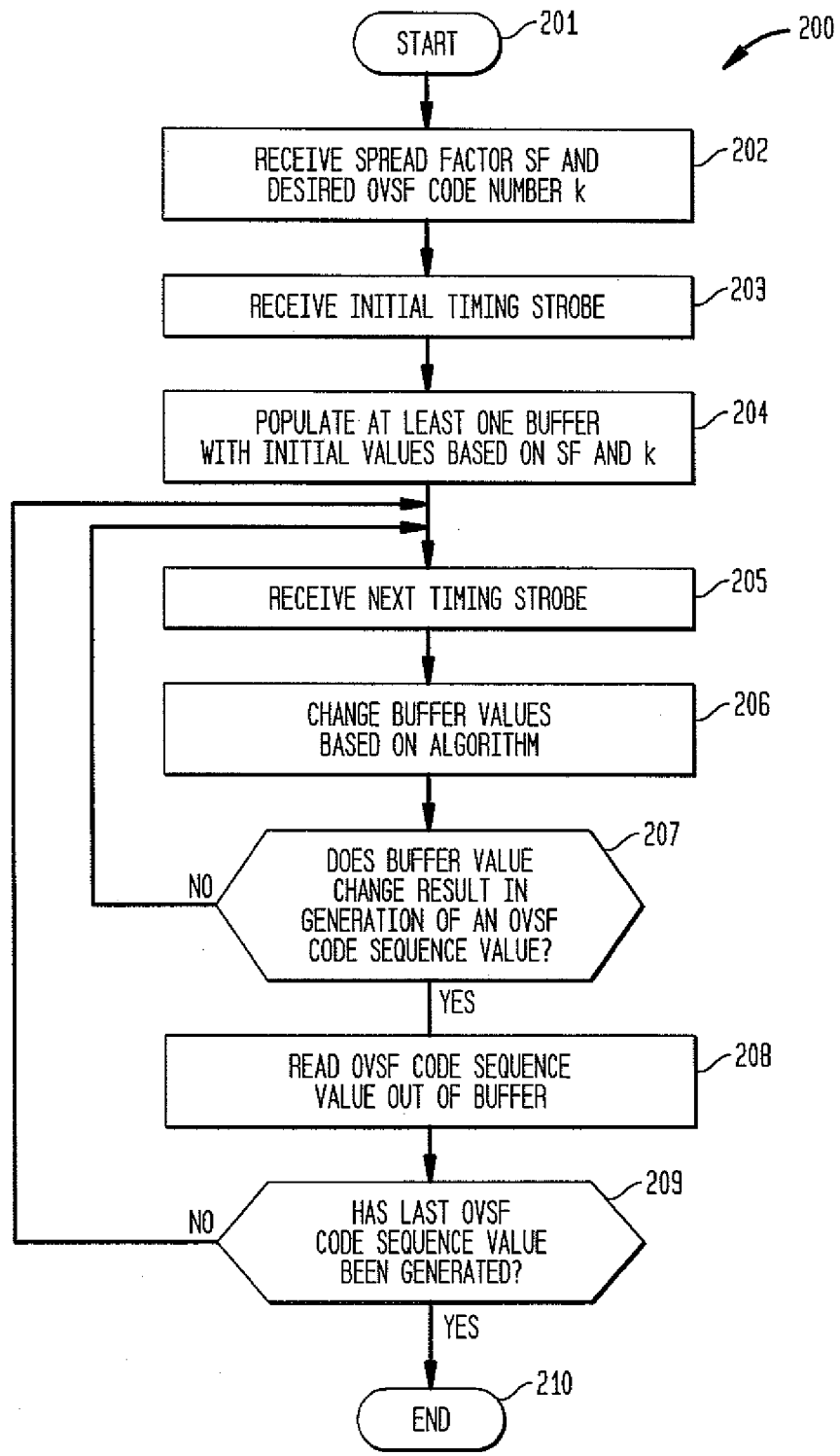
FIG. 2 is a flowchart illustrating an exemplary method for generating OVSF code sequences without the use of a chip-rate counter, in accordance with the present invention.

FIG. 2 is a flowchart 200 illustrating an exemplary method for generating OVSF code sequences without the use of a chip-rate counter, in accordance with the present invention. It should be understood that the broad method of flowchart 200 can be implemented by either the first algorithm or the second algorithm described below. The method of flowchart 200 begins at step 201. At step 202, spread factor SF and code index k of the desired OVSF code pattern are received.

At step 203, an initial timing strobe is received. The timing strobe can be a pulse or other time interval identifier that may include an associated counter value (e.g., as may supplied by a chip-rate counter). However, the timing strobe is not required by the present invention to include an associated counter value (e.g., as may be supplied by a global clock), since the algorithms of the various embodiments of the present invention do not require that the timing strobe include count values. Alternatively, in various embodiments of the present invention, the output of a counter may be used merely for timing purposes, such that the algorithm does not employ the count value itself in generating code sequences.

At step 204, at least one buffer is populated with certain initial values based on the values of SF and k. At step 205, another timing strobe is received. At step 206, the values in the buffer change based on an algorithm, such as the First Algorithm or Second Algorithm described below. At step 207, a determination is made whether the change in the buffer values results in the generation of an OVSF code sequence value (i.e., a −1 or a +1), in which case the method proceeds to step 208 so that the OVSF code sequence value can be read out of the buffer. If, at step 207, it is determined that no OVSF code sequence value is generated, then the method returns to step 205 for another timing strobe to be received. At step 209, a determination is made whether the last OVSF code sequence value in the sequence has been generated, in which case the method ends at step 210. If, at step 209, it is determined that the last OVSF code sequence value has not been generated, then the method returns to step 205 for another timing strobe to be received.

Further details of two exemplary algorithms for generating OVSF code patterns without a chip-rate counter, as well as an exemplary time-multiplexed code generator for generating multiple codes at a time using only a single OVSF code generator consistent with the present invention, will now be provided.

First Algorithm

In a first exemplary algorithm consistent with the present invention, OVSF code patterns are generated using a recursive function, such as the function ssf provided in the following pseudo-code:

```
ssf(n,k)
    if (n=0) return "1" on chip strobe
    else
        ssf(n−1, k/2)
        if (k is even) ssf(n−1, k/2)
        else −[ssf(n−1, k/2)]
        endif
    endif
end
```

In the above pseudo-code, n is equal to $\log_2$ of the spread factor (where n=0 . . . 9), and k is the desired OVSF code index (where k=0 . . . $2^n-1$). The unary operation "−" in the above pseudo-code describes the negation of each element of the entire sequence generated by the second recursive call of the ssf function (in square brackets). The ssf function may be coded in C as follows:

```
/* n = log2(SF)                    */
/* k = code index, k= 0..(2^n)−1   */
/* s coding: {−1,1} maps to {1,0}  */
int ssf (int n, int k, int s)
{
if (!n)
    if (!s) printf ("1");
    else printf ("−1");
else {
    ssf (n−1, k/2, s);
    if (!(k&01))
        ssf (n−1, k/2, s);
    else
        ssf (n−1, k/2, (~s));
    }
}
```

In the above C code, the sign s of an element in an OVSF sequence is passed on recursively as the third parameter, to offer the same functionality as the unary operator in the above pseudo-code, but in a more convenient fashion for a practical implementation. The value of s in the initial function call is always 0. The operator "~" describes the inversion of s, i.e., if s is 0, it becomes 1, and if s is 1, it becomes 0.

Figure 3:
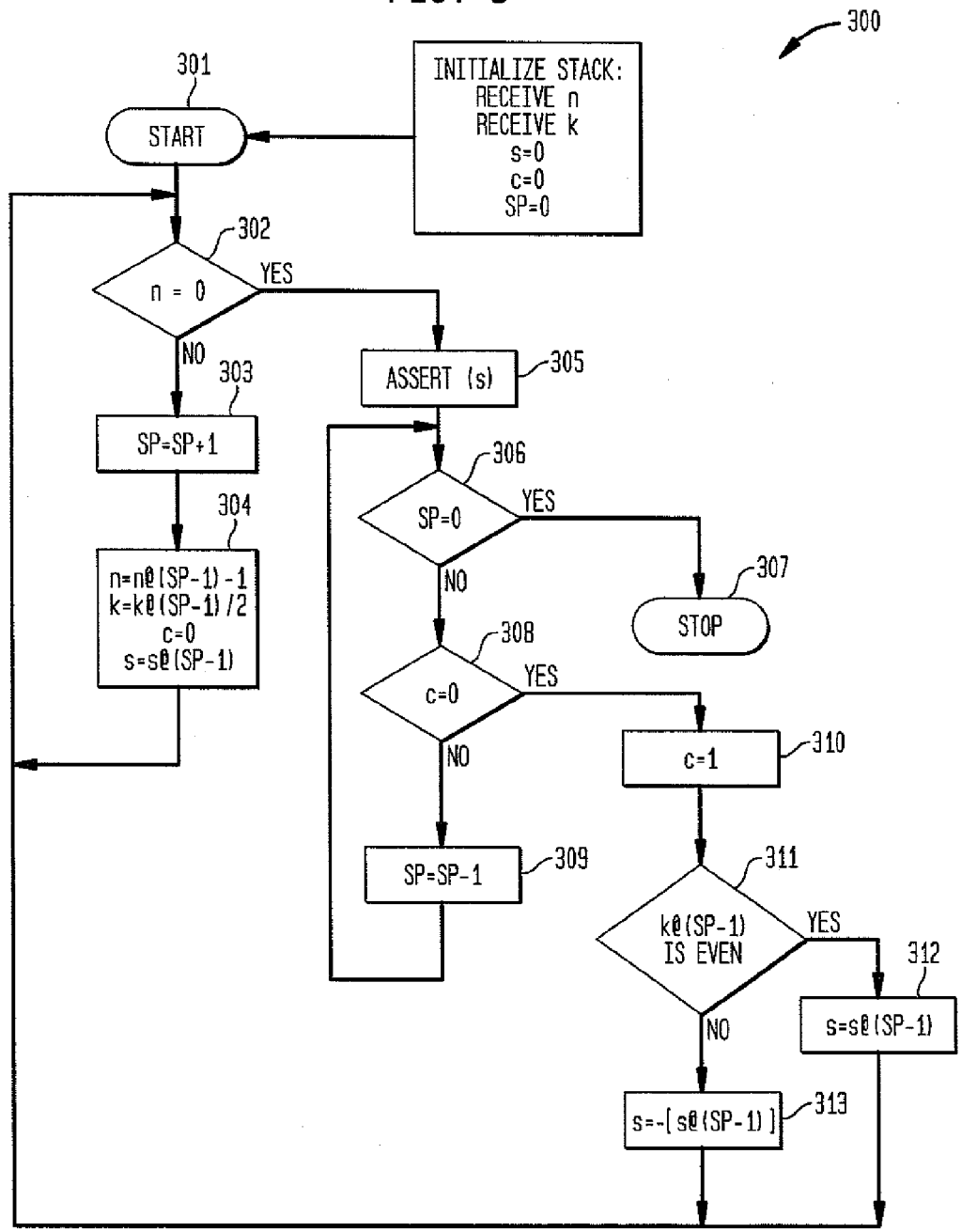
FIG. 3 is a flowchart illustrating a first exemplary algorithm consistent with the present invention.

Turning now to FIG. 3, a flowchart 300 of an exemplary OVSF code generation method illustrates how the ssf function can be implemented in hardware using a limited-size stack buffer (the "stack"). The term "stack," as used herein, generally refers to a first-in, last-out (FILO) or a last-in, first-out (LIFO) buffer. In flowchart 300, the following notation is used:

n is the $\log_2$ of the spread factor, n=0 . . . 9;

k is the code index of the desired OVSF code, k=0 . . . [($2^n$)−1], if k=0 then the OVSF code sequence contains all "1"s;

s is the sign of an element in the spreading code sequence, s=+1 or −1;

c is a recursive function call tag indicating the level of recursion, c=0 or 1, for operations corresponding to the first or second recursive ssf call, respectively; and SP is the stack pointer, SP=0 . . . 9, which points to the top of the stack that holds n, s, and c.

The stack holds parameters n (4 bits), s (1 bit), and c (1 bit) for operations corresponding to each recursive call of the ssf function. In the algorithm shown in flowchart 300, parameter k (9 bits) is stored on the stack. However, in an alternative embodiment of the algorithm, parameter k could be stored separately from the stack to increase efficiency. For example, the operations of recursively computing k=k/2 (using integer division), storing k on the stack and testing top-of-stack k for being even could be replaced with a single operation of testing the (SP−1) position bit (from the right) of initial k for being "0". This single operation would replace testing k for being even in step 311 of the flowchart, and the k assignment step k=(k@(SP−1))/2 in step 304 would be removed. The assert operation of step 305 outputs an element of OVSF code sequence, i.e., either +1 or −1, based on whether s is 0 or 1. The coding of s is mapped as follows: +1 is coded as 0, and −1 is coded as 1, to be consistent with the ssf function above.

The method of flowchart 300 begins at step 301, wherein a stack containing variables n, k, s, c, and SP is initialized, and s, c, and SP are set to 0. The values for variables n ($\log_2$ of spread factor SF) and k (the OVSF code index of the desired sequence) are received and stored on the top of the stack. At step 302, a determination is made whether top-of-stack n is equal to 0. If top-of-stack n is not equal to 0, then the method proceeds to step 303, wherein SP is incremented by 1, creating a new, empty top-of-stack row. Next, at step 304, n at stack location SP−1 is decremented by 1 and the result stored as top-of-stack n, k at stack location SP−1 is divided by 2 and the result stored as top-of-stack k, top-of-stack c is set to 0, and top-of-stack s is set to the value of s at stack location SP−1, after which the method returns to step 302. If, at step 302, it is determined that top-of-stack n is equal to 0, then the method proceeds to step 305, wherein the assert function is called for top-of-stack s to output a +1 if top-of-stack s is equal to 0, or a −1 if top-of-stack s is equal to 1. Next, at step 306, a determination is made whether SP is equal to 0, in which case the code generation is complete, and the method terminates at step 307. If, at step 306, it is determined that SP is not equal to 0, then the method proceeds to step 308. At step 308, a determination is made whether top-of-stack c is equal to 0. If top-of-stack c is not equal to 0, then the method proceeds to step 309, wherein SP is decremented by 1, after which the method returns to step 306. If, at step 308, it is determined that top-of-stack c is not equal to 0, then the method proceeds to step 310, wherein top-of-stack c is set to 1. Next, at step 311, a determination is made whether k at stack location SP−1 is even, in which case the method proceeds to step 312. At step 312, top-of-stack s is set to the value of s at stack location SP−1, after which the method returns to step 302. If, at step 311, it is determined that k at stack location SP−1 is not even, then the method proceeds to step 213. At step 213, top-of-stack s is set to the inverse of the value of s at stack location SP−1, after which the method proceeds to step 302.

FIG. 4 is a set of stack diagrams illustrating graphically the contents of the stack in an exemplary code sequence generation, to illustrate the operation of flowchart 300. In this example, the spread factor is SF=16 (hence, n=4), and the sequence for OVSF code index 9 is requested. Thus, variables n and k in the initial row of the stack will be initialized to the values n=4 and k=9. The corresponding OVSF codes for SF=16 are shown in the following Table I:

TABLE I

| OVSF Code Number | OVSF code |
|---|---|
| 0 | 1, 1, 1, 1, 1, 1, 1, 1, 1, 1, 1, 1, 1, 1, 1, 1 |
| 1 | 1, 1, 1, 1, 1, 1, 1, 1, −1, −1, −1, −1, −1, −1, −1, −1 |
| 2 | 1, 1, 1, 1, −1, −1, −1, −1, 1, 1, 1, 1, −1, −1, −1, −1 |
| 3 | 1, 1, 1, 1, −1, −1, −1, −1, −1, −1, −1, −1, 1, 1, 1, 1 |
| 4 | 1, 1, −1, −1, 1, 1, −1, −1, 1, 1, −1, −1, 1, 1, −1, −1 |
| 5 | 1, 1, −1, −1, 1, 1, −1, −1, −1, −1, 1, 1, −1, −1, 1, 1 |
| 6 | 1, 1, −1, −1, −1, −1, 1, 1, 1, 1, −1, −1, −1, −1, 1, 1 |
| 7 | 1, 1, −1, −1, −1, −1, 1, 1, −1, −1, 1, 1, 1, 1, −1, −1 |
| 8 | 1, −1, 1, −1, 1, −1, 1, −1, 1, −1, 1, −1, 1, −1, 1, −1 |
| 9 | 1, −1, 1, −1, 1, −1, 1, −1, −1, 1, −1, 1, −1, 1, −1, 1 |
| 10 | 1, −1, 1, −1, −1, 1, −1, 1, 1, −1, 1, −1, −1, 1, −1, 1 |

TABLE I-continued

| OVSF Code Number | OVSF code |
|---|---|
| 11 | 1, −1, 1, −1, −1, 1, −1, 1, −1, 1, −1, 1, 1, −1, 1, −1 |
| 12 | 1, −1, −1, 1, 1, −1, −1, 1, 1, −1, −1, 1, 1, −1, −1, 1 |
| 13 | 1, −1, −1, 1, 1, −1, −1, 1, −1, 1, 1, −1, −1, 1, 1, −1 |
| 14 | 1, −1, −1, 1, −1, 1, 1, −1, 1, −1, −1, 1, −1, 1, 1, −1 |
| 15 | 1, −1, −1, 1, −1, 1, 1, −1, −1, 1, 1, −1, 1, −1, −1, 1 |

The desired OVSF sequence in this example is the one corresponding to OVSF code index 9, which is: {1,−1, 1,−1, 1,−1, 1,−1, 1,−1, 1,−1, 1,−1, 1,−1, 1}. To arrive at this sequence, the following steps take place (the "iterations" set forth below are provided for ease of reference and merely refer to instances of updating one or more stack variables; the "iterations" do not necessarily correspond to any particular steps or substeps within flowchart 300:

At iteration 1, the stack containing variables n, k, s, c, and SP is initialized at step 301, and s, c, and SP are set to 0. The value for n is set to 4 (for a spread factor SF=16) and the value for k is set to 9 for OVSF code index 9. It is determined at step 302 that top-of-stack n is not equal to 0, and so the method proceeds to step 303.

At iteration 2, the value 0 of SP is incremented by 1, creating a new, empty top-of-stack row. Next, at step 304, the value 4 for n at stack location SP−1 is decremented by 1, and the result 3 is stored as top-of-stack n. The value 9 for k at stack location SP−1 is divided by 2, and the result 4 is stored as top-of-stack k. The value for top-of-stack c is set to 0. The value for top-of-stack s is set to 0, i.e., the value of s at stack location SP−1, and the method returns to step 302. It is determined at step 302 that top-of-stack n is not equal to 0, and so the method proceeds to step 303.

At iteration 3, the value 1 of SP is incremented by 1, creating a new, empty top-of-stack row. Next, at step 304, the value 3 for n at stack location SP−1 is decremented by 1, and the result 2 is stored as top-of-stack n. The value 4 for k at stack location SP−1 is divided by 2, and the result 2 is stored as top-of-stack k. The value for top-of-stack c is set to 0. The value for top-of-stack s is set to 0, i.e., the value of s at stack location SP−1, and the method returns to step 302. It is determined at step 302 that top-of-stack n is not equal to 0, and so the method proceeds to step 303.

At iteration 4, the value 2 of SP is incremented by 1, creating a new, empty top-of-stack row. Next, at step 304, the value 2 for n at stack location SP−1 is decremented by 1, and the result 1 is stored as top-of-stack n. The value 2 for k at stack location SP−1 is divided by 2, and the result 1 is stored as top-of-stack k. The value for top-of-stack c is set to 0. The value for top-of-stack s is set to 0, i.e., the value of s at stack location SP−1, and the method returns to step 302. It is determined at step 302 that top-of-stack n is not equal to 0, and so the method proceeds to step 303.

At iteration 5, the value 3 of SP is incremented by 1, creating a new, empty top-of-stack row. Next, at step 304, the value 1 for n at stack location SP−1 is decremented by 1, and the result 0 is stored as top-of-stack n. The value 1 for k at stack location SP−1 is divided by 2, and the result 0 is stored as top-of-stack k. The value for top-of-stack c is set to 0. The value for top-of-stack s is set to 0, i.e., the value of s at stack location SP−1, and the method returns to step 302. Since top-of-stack n is equal to 0, the method proceeds to step 305, wherein the assert function is called. The assert function outputs a value of +1 because top-of-stack s is equal to 0. At step 306, it is determined that SP is not equal to 0, and the method proceeds to step 308. At step 308, it is determined that top-of-stack c is equal to 0.

At iteration 6, the value for top-of-stack c is set to 1 at step 310. At step 311, it is determined that the value 1 for k at stack location SP−1 is not even. At step 213, the value for top-of-stack s is set to 1, which is the inverse of the value 1 of s at stack location SP−1. The method proceeds to step 302.

At iteration 7, since top-of-stack n is equal to 0, the method proceeds to step 305, wherein the assert function is called. The assert function outputs a value of −1 because top-of-stack s is equal to 1. At step 306, it is determined that SP is not equal to 0, and the method proceeds to step 308.

At iteration 8, at step 308, it is determined that top-of-stack c is not equal to 0, and so, at step 309, SP is decremented by 1, removing the top row from the stack. At step 306, it is determined that SP is not equal to 0, and the method proceeds to step 308. At step 308, it is determined that top-of-stack c is equal to 0, and the method proceeds to step 310, wherein top-of-stack c is set to 1. It is determined at step 311 that the value 2 for k at stack location SP−1 is even. At step 312, the value for top-of-stack s is set to 0, which is the value of s at stack location SP−1.

At iteration 9, the method proceeds to step 302. Since top-of-stack n is not equal to 0, the method proceeds to step 303, wherein the value 3 of SP is incremented by 1, creating a new, empty top-of-stack row. Next, at step 304, the value 1 for n at stack location SP−1 is decremented by 1, and the result 0 is stored as top-of-stack n. The value 1 for k at stack location SP−1 is divided by 2, and the result 0 is stored as top-of-stack k. The value for top-of-stack c is set to 0. The value for top-of-stack s is set to 0, i.e., the value of s at stack location SP−1, and the method returns to step 302. Since top-of-stack n is equal to 0, the method proceeds to step 305, wherein the assert function is called. The assert function outputs a value of +1 because top-of-stack s is equal to 0. At step 306, it is determined that SP is not equal to 0, and the method proceeds to step 308.

The method continues to follow flowchart 300 until step 307 is reached and the method ends, as shown in Iterations 10 through 64 of FIG. 4. By the end of this process, the entire sequence corresponding to OVSF code index 9, i.e., {1,−1, 1,−1, 1,−1, 1,−1,−1, 1,−1, 1,−1, 1,−1, 1} will have been generated efficiently, without the use of a chip-rate counter.

Second Algorithm

In a second exemplary algorithm consistent with the present invention, the OVSF codes are generated using a look-up table (LUT), such as the following Table II, which provides the OVSF codes for a spread factor of 4:

TABLE II

| k | OVSF bit for SF 4 | | | |
|---|---|---|---|---|
| 0 (00) | 0 | 0 | 0 | 0 |
| 1 (01) | 0 | 0 | 1 | 1 |
| 2 (10) | 0 | 1 | 0 | 1 |
| 3 (11) | 0 | 1 | 1 | 0 |

In Table II and in the description below, the set of possible code values {−1,1} is mapped to {1,0} to simplify calculations, as in the first algorithm described above.

Figure 5:
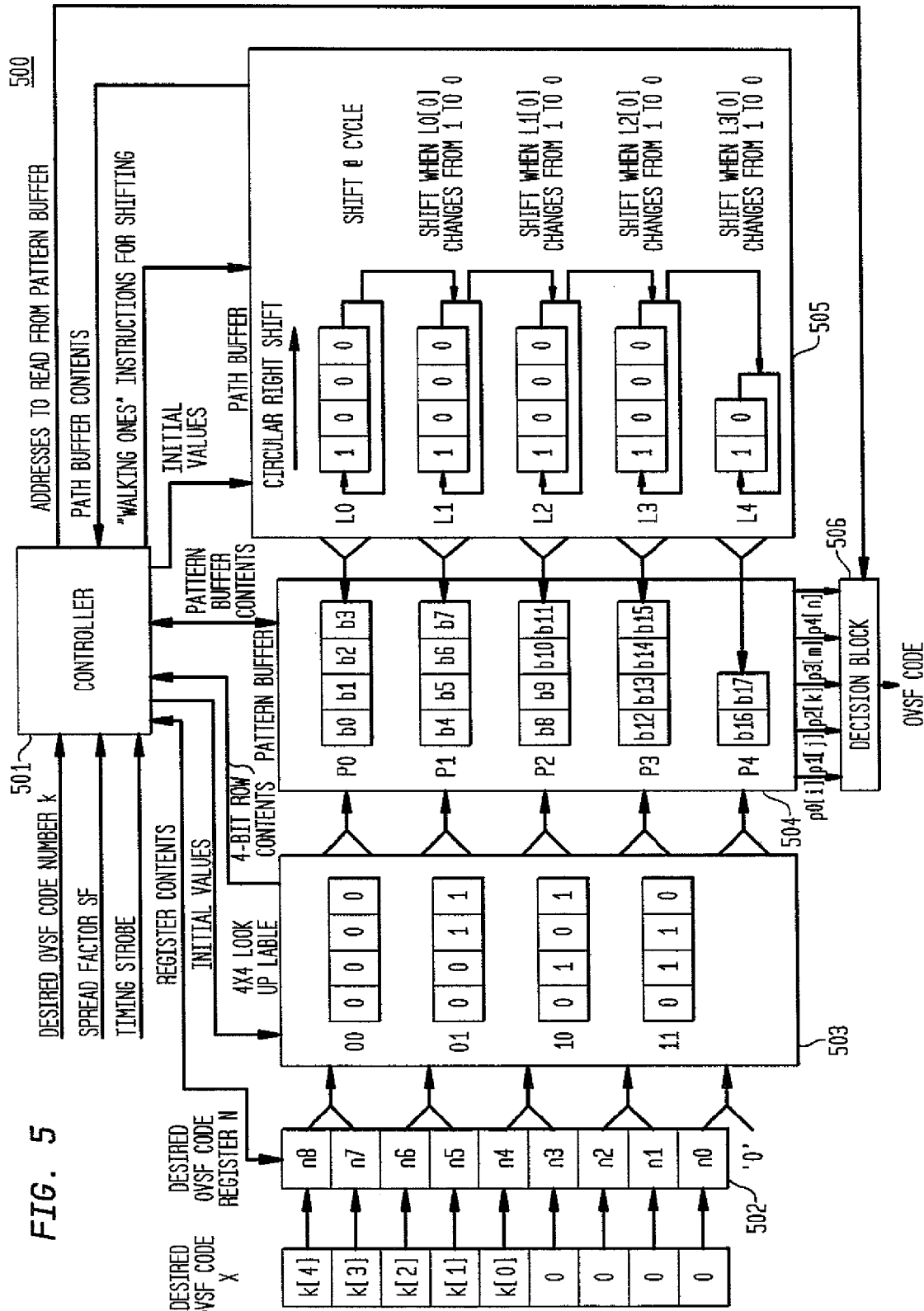
FIG. 5 is a hardware diagram illustrating a 4×4 LUT-based 3GPP OVSF code generator employing a second exemplary algorithm consistent with the present invention.
Figure 6:
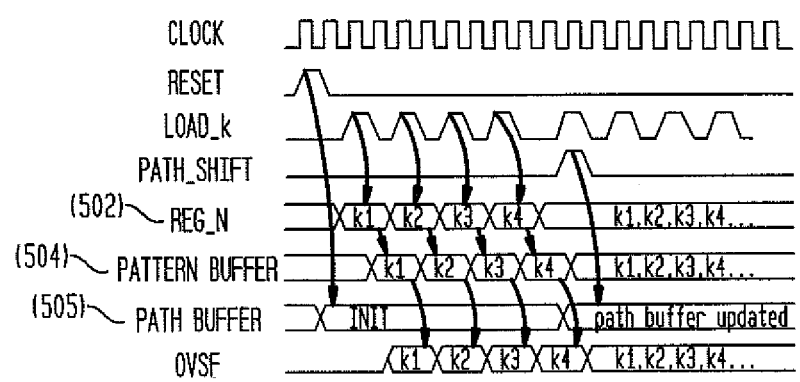
FIG. 6 is a timing diagram of a hardware code generator embodiment employing multiplexing to generate multiple codes at a time using only a single OVSF code generator consistent with the present invention.

With reference now to FIG. 5, a hardware diagram illustrates a 4×4 LUT-based 3GPP OVSF code generator 500 employing a second algorithm consistent with the present invention. As shown, the code generator comprises a controller 501, a desired OVSF code register 502, LUT 503, a pattern buffer 504, a path buffer 505, and a decision block 506.

As shown in FIG. 5, controller 501 coordinates the reading and writing of values stored in desired OVSF code register 502, LUT 503, pattern buffer 504, and path buffer 505 and also controls the operation of decision block 506. Controller 501 receives a timing strobe (from an external source) that governs the timing of its operations. The arrows between desired OVSF code register 502, LUT 503, pattern buffer 504, path buffer 505, and decision block 506 are provided merely to illustrate data flow between these components, which may occur directly, via controller 501, or via other components, and do not necessarily represent direct connections between these components.

Desired OVSF code register 502 is a 9-bit register with memory locations N[8:0]. Initially, controller 501 stores the desired OVSF code sequence corresponding to code index k in register 502 by populating the MSB bits of memory locations N[8:0] with the binary representation of the desired OVSF code index k (received from an external source), with the LSB bits of memory locations N[8:0] filled with zero values, i.e., k[MSB], k[MSB−1], . . . , k[LSB], 0, . . . , 0. For example, if k is 9, then desired OVSF code register 502 is filled with the following values: 100100000. While in the example of FIG. 5, the buffer sizes (of desired OVSF code register 502, pattern buffer 504, and path buffer 505) are sized to support a spreading factor of up to 512, other buffer sizes are possible. It should be understood that the number of memory locations N should be equal to or greater than $\log_2(SF)$ to have sufficient storage for a binary representation of k. If the number of memory locations N is equal to $\log_2(SF)$, then memory locations $[\log_2(SF)-1:0]$ will contain a binary representation of k. If the number of memory locations is greater than $\log_2(SF)$, then the MSB bits of memory locations $[\log_2(SF)-1:0]$ contain a binary representation of k, and the LSB bits of memory locations $[\log_2(SF)-1:0]$ contain zero values.

LUT 503 is a 4×4 look-up table populated with the OVSF codes shown in Table II above. The values in LUT 503 remain constant and can either be stored permanently in LUT 503 or initialized (e.g., using controller 501) at the beginning of the code generation process to contain the correct values.

As shown in FIG. 5, pattern buffer 504 contains bits b0 through b17 stored across 5 levels. The bottom 4 levels (P0 through P3) each have 4 bits (P0 contains bits b0 through b3, P1 contains bits b4 through b7, P2 contains bits b8 through b11, and P3 contains bits b12 through b15). The top level (P4) has 2 bits (bits b16 and b17).

For each level of pattern buffer 504, controller 501 looks up content in LUT 503 using a specified two-bit sequence and stores in the level of pattern buffer 504 the values read from LUT 503 (i.e., the 4-bit row contents) that correspond to the two-bit sequence provided by desired OVSF code register 502, as follows: The values stored in memory locations N[8:7] are used to look up content for level P0 (bits b0-b3) in LUT 503 to populate pattern buffer 504. The values stored in memory locations N[6:5] are used to look up content for level P1 (bits b4-b7) in LUT 503 to populate pattern buffer 504. The values stored in memory locations N[4:3] are used to look up content for level P2 (bits b8-b11) in LUT 503 to populate pattern buffer 504. The values stored in memory locations N[2:1] are used to look up content for level P3 (bits b12-b15) in LUT 503 to populate pattern buffer 504. The value stored in memory location N[0] concatenated with the value "0" are used to look up content for level P4 (bits b16 and b17) in LUT 503 to populate pattern buffer 504.

For example, given a spread factor of SF=256, if the desired OVSF code index is k=169, then controller 501 fills desired OVSF code register 502 with the sequence 10101001; 0, which sequence will be used as the LUT index. Next, controller 501 fills pattern buffer 504 with the content shown in the following Table III:

TABLE III

|  | LUT index |  | Pattern Buffer Content |  |  |
|---|---|---|---|---|---|
| Level P0 | 10 | 0 | 1 | 0 | 1 |
| Level P1 | 10 | 0 | 1 | 0 | 1 |
| Level P2 | 10 | 0 | 1 | 0 | 1 |
| Level P3 | 01 | 0 | 0 | 1 | 1 |
| Level P4 | 00 | 0 | 0 |  |  |

Path buffer 505 has 5 levels, which permits code generator 500 to support a spread factor of up to SF=512. As with pattern buffer 504, the bottom four levels each have 4 bits, and the top level has 2 bits. Controller 501 initializes path buffer 505 to contain the values in the following Table IV:

TABLE IV

| Level L0 | 1 | 0 | 0 | 0 |
|---|---|---|---|---|
| Level L1 | 1 | 0 | 0 | 0 |
| Level L2 | 1 | 0 | 0 | 0 |
| Level L3 | 1 | 0 | 0 | 0 |
| Level L4 | 1 | 0 |  |  |

At each assertion of the timing strobe (i.e., each clock cycle) during the code generation process, controller 501 performs a "walking ones" operation to right-shift circularly (i.e., from left to right in a circular manner) the position of one or more of the "1" bits in path buffer 505, as follows: Level L0 will be shifted one bit to the right, such that the LSB bit is shifted to become the MSB. Level L1 will be shifted one bit to the right only when the LSB of Level L0 turns to "0" from "1". Similarly, Level L2 has dependency on Level L1 so as to shift one bit to the right only when the LSB of Level L1 turns from "0" to "1"; Level L3 has dependency on Level L2 so as to shift one bit to the right only when the LSB of Level L2 turns from "0" to "1"; and Level L4 has dependency on Level L3 so as to shift one bit to the right only when the LSB of Level L3 turns from "0" to "1".

Next, for each level of path buffer 505, controller 501 selects a bit in the corresponding level of pattern buffer 504 to send to decision block 506. Controller 501 determines this bit selection by the position of the "1" bit in the corresponding level of path buffer 505. In other words, one bit from each level of pattern buffer 504 at a time is sent to decision block 506, for a total of 5 bits: p0[i], p1[j], p2[k], p3[m], and p4[n].

Decision block 506 performs an XOR operation (or other decision method) among the 5 selected bits p0[i], p1[j], p2[k], p3[m], and p4[n] from pattern buffer 504 to decide the OVSF code. Following the XOR operation, controller 501 performs another "walking ones" operation on the bits of path buffer 505, controller 501 selects another bit from each of the five levels of pattern buffer 504 to send to decision block 506, and decision block 506 performs another XOR operation, and so forth. This process continues until the entire OVSF code sequence has been generated and may be repeated subsequently for one or more additional OVSF code sequences.

With reference to the following Tables the steps of an exemplary code sequence generation will now be provided to illustrate the operation of code generator 500. In this example, the spread factor is SF=16, and the sequence for OVSF code index 9 is requested. Thus, the values SF=16 and k=9 will be provided to controller 501. The corresponding OVSF codes for SF=16 are shown in Table I above. The desired OVSF sequence in this example is the one corresponding to OVSF code index 9, which is: $\{1,-1, 1,-1, 1,-1, 1,-1,-1, 1,-1, 1,-1, 1,-1, 1\}$. Mapping the code values $\{-1,1\}$ to $\{1,0\}$, the desired OVSF sequence becomes $\{0, 1, 0, 1, 0, 1, 0, 1, 1, 0, 1, 0, 1, 0, 1, 0\}$. To arrive at this sequence, the following steps take place:

Controller 501 receives the spread factor of 16 and assigns this value to SF. Controller 501 receives the value of the desired OVSF code index, i.e., 9, or $\{1001\}$ and assigns this value to k. Controller 501 fills desired OVSF code register 502 with the following values: $\{k[3], k[2], k[1], k[0], k[0], 0, 0, 0, 0\}$, i.e. $\{10, 01, 00, 00, 0\}$.

Pattern buffer 504 is initialized based on the contents of register 502, as follows: For Level P0 of pattern buffer 504, controller 501 looks up content in LUT 503 using the specified two-bit sequence N[8:7] stored in desired OVSF code register 502 (which contains the values "10"), and reads the 4-bit row contents in LUT 503 that correspond to the sequence "10", i.e.,"0101". Controller 501 then stores the retrieved sequence "0101" in level P0 of pattern buffer 504. For Level P1 of pattern buffer 504, controller 501 looks up content in LUT 503 using the specified two-bit sequence N[6:5] stored in desired OVSF code register 502 (which contains the values "01"), and reads the 4-bit row contents in LUT 503 that correspond to the sequence "01", i.e., "0011". Controller 501 then stores the retrieved sequence "0011" in level P1 of pattern buffer 504. For Level P2 of pattern buffer 504, controller 501 looks up content in LUT 503 using the specified two-bit sequence N[4:3] stored in desired OVSF code register 502 (which contains the values "00"), and reads the 4-bit row contents in LUT 503 that correspond to the sequence "00", i.e., "0000". Controller 501 then stores the retrieved sequence "0000" in level P2 of pattern buffer 504. For Level P3 of pattern buffer 504, controller 501 looks up content in LUT 503 using the specified two-bit sequence N[2:1] stored in desired OVSF code register 502 (which contains the values "00"), and reads the 4-bit row contents in LUT 503 that correspond to the sequence "00", i.e., "0000". Controller 501 then stores the retrieved sequence "0000" in level P3 of pattern buffer 504. For Level P4 of pattern buffer 504, controller 501 looks up content in LUT 503 using the specified one-bit value N[0] stored in desired OVSF code register 502 and concatenates the value of N[0] (which contains the value "0") with the value "0". Controller 501 then reads the 0-bit row contents in LUT 503 that correspond to the sequence "00", i.e., "0000". Controller 501 then stores the retrieved sequence "00" in level P4 of pattern buffer 504. It is noted that the last two bits of the sequence "0000" are simply ignored, since Level P4 of pattern buffer 504 has storage for only 2 bits. After the foregoing steps for populating pattern buffer 504, the contents of pattern buffer 504 are as shown in the following Table V:

TABLE V

| Level P0 | 0 | 1 | 0 | 1 |
|---|---|---|---|---|
| Level P1 | 0 | 0 | 1 | 1 |
| Level P2 | 0 | 0 | 0 | 0 |
| Level P3 | 0 | 0 | 0 | 0 |
| Level P4 | 0 | 0 |  |  |

Path buffer 505 has already been prepopulated with the values shown in the following Table VI:

TABLE VI

| Level L0 | 1 | 0 | 0 | 0 |
| --- | --- | --- | --- | --- |
| Level L1 | 1 | 0 | 0 | 0 |
| Level L2 | 1 | 0 | 0 | 0 |
| Level L3 | 1 | 0 | 0 | 0 |
| Level L4 | 1 | 0 | | |

Now, generation of the first bit of the OVSF sequence begins. Controller 501 reads the position of the "1" in Level L0 of path buffer 505 and uses this position as an index to read the value that has the same position in Level P0 of pattern buffer 504, which is a "0". Next, controller 501 reads the position of the "1" in Level L1 of path buffer 505 and uses this position as an index to read the value that has the same position in Level P1 of pattern buffer 504, which is a "0". Next, controller 501 reads the position of the "1" in Level L2 of path buffer 505 and uses this position as an index to read the value that has the same position in Level P2 of pattern buffer 504, which is a "0". Next, controller 501 reads the position of the "1" in Level L3 of path buffer 505 and uses this position as an index to read the value that has the same position in Level P3 of pattern buffer 504, which is a "0". Next, controller 501 reads the position of the "1" in Level L4 of path buffer 505 and uses this position as an index to read the value that has the same position in Level P4 of pattern buffer 504, which is a "0". Controller 501 causes the 5-bit sequence p0[i], p1[j], p2[k], p3[m], and p4[n] containing the values read from pattern buffer 504, i.e., "00000", to be provided to decision block 506.

Decision block 506 performs an XOR operation on the values p0[i], p1[j], p2[k], p3[m], and p4[n] ({0, 0, 0, 0, 0}) of the received sequence "00000" and returns a "0", which is the first OVSF code bit in the desired sequence corresponding to OVSF code index 9.

After completing the generation of the first OVSF code bit, the contents of Level L0 of path buffer 505 are circularly right-shifted by one bit, so that path buffer 505 now contains the values shown in the following Table VII:

TABLE VII

| Level L0 | 0 | 1 | 0 | 0 |
| --- | --- | --- | --- | --- |
| Level L1 | 1 | 0 | 0 | 0 |
| Level L2 | 1 | 0 | 0 | 0 |
| Level L3 | 1 | 0 | 0 | 0 |
| Level L4 | 1 | 0 | | |

Now, generation of the second bit of the OVSF sequence begins. Controller 501 reads the position of the "1" in Level L0 of path buffer 505 and uses this position as an index to read the value that has the same position in Level P0 of pattern buffer 504, which is a "1". Next, controller 501 reads the position of the "1" in Level L1 of path buffer 505 and uses this position as an index to read the value that has the same position in Level P1 of pattern buffer 504, which is a "0". Next, controller 501 reads the position of the "1" in Level L2 of path buffer 505 and uses this position as an index to read the value that has the same position in Level P2 of pattern buffer 504, which is a "0". Next, controller 501 reads the position of the "1" in Level L3 of path buffer 505 and uses this position as an index to read the value that has the same position in Level P3 of pattern buffer 504, which is a "0". Next, controller 501 reads the position of the "1" in Level L4 of path buffer 505 and uses this position as an index to read the value that has the same position in Level P4 of pattern buffer 504, which is a "0". Controller 501 causes the 5-bit sequence p0[i], p1[j], p2[k], p3[m], and p4[n] containing the values read from pattern buffer 504, i.e., "10000", to be provided to decision block 506. Decision block 506 performs an XOR operation on the values p0[i], p1[j], p2[k], p3[m], and p4[n] ({1, 0, 0, 0, 0}) of the received sequence "10000" and returns a "1", which is the second OVSF code bit in the desired sequence corresponding to OVSF code index 9.

After completing the generation of the second OVSF code bit, the contents of Level L0 of path buffer 505 are circularly right-shifted by one bit, so that path buffer 505 now contains the values shown in the following Table VIII:

TABLE VIII

| Level L0 | 0 | 0 | 1 | 0 |
| --- | --- | --- | --- | --- |
| Level L1 | 1 | 0 | 0 | 0 |
| Level L2 | 1 | 0 | 0 | 0 |
| Level L3 | 1 | 0 | 0 | 0 |
| Level L4 | 1 | 0 | | |

Generation of the third bit of the OVSF sequence now takes place, and the foregoing process continues in this manner, until the "1" in Level L0 is shifted back into its initial position, at which point the "1" in Level L1 starts to right-shift circularly by one bit. Once the "1" in Level 1 is shifted back into its initial position, the "1" in Level L2 starts to right-shift circularly by one bit, and so forth. When this process is complete, the entire OVSF sequence for OVSF code index 9 {0, 1, 0, 1, 0, 1, 0, 1, 1, 0, 1, 0, 1, 0, 1, 0}, i.e., {1,–1, 1,–1, 1,–1, 1,–1,–1, 1,–1, 1,–1, 1,–1, 1}, will have been generated efficiently, without the use of a chip-rate counter. It is noted that the contents of pattern buffer 504 remain unchanged during this entire process and only change if a new OVSF code sequence with a different OVSF code index is requested.

Time-Multiplexed Code Generator

FIG. D illustrates the processing flow and timing of an exemplary time-multiplexed code generator for generating four codes at a time using only a single OVSF code generator consistent with the present invention. In this embodiment, the code generator contains similar hardware components as code generator 500 of FIG. 5, with several additional signals provided to the controller to govern the time-multiplexing. In this four-code embodiment, there are four desired OVSF code indices k1, k2, k3, and k4. Other embodiments with other numbers of (i.e., 2 or more) OVSF code indices may alternatively be employed. Path buffer 505 is common to all four code indices and is shifted once every chip period, i.e., after an OVSF sequence bit has been generated for all four code indices, pattern buffer 504 is reloaded to generate an OVSF sequence bit for each code of the four code indices during every chip period.

Path buffer 505 is reset to its initial values when a reset signal is asserted. As shown, desired OVSF code register 502 (reg_N) is loaded serially with the corresponding desired OVSF code indices k1, k2, k3, and k4, respectively, at a plurality of instances at which a load_k signal is asserted. Pattern buffer 504 is filled serially with the patterns from LUT 503 based on the current contents of the desired OVSF code register, first with the pattern corresponding to OVSF code index k1, then with the pattern corresponding to OVSF code index k2, then with the pattern corresponding to OVSF code index k3, and then with the pattern corresponding to OVSF code index k4.

Based on the pattern buffer contents corresponding to code index k1 and the contents of the path buffer (which will remain the same for all four code indices), a 5-bit sequence p0[i], p1[j], p2[k], p3[m], and p4[n] containing the values read from the pattern buffer is provided to decision block 506 to obtain the first bit for code index k1. Next, based on the pattern buffer contents corresponding to code index k2 and the contents of the path buffer, a 5-bit sequence p0[i], p1[j], p2[k], p3[m], and p4[n] containing the values read from the pattern buffer is provided to the decision block to obtain the first bit for code index k2. Next, based on the pattern buffer contents corresponding to code index k3 and the contents of the path buffer, a 5-bit sequence p0[i], p1[j], p2[k], p3[m], and p4[n] containing the values read from the pattern buffer is provided to the decision block to obtain the first bit for code index k3. Next, based on the pattern buffer contents corresponding to code index k4 and the contents of the path buffer, a 5-bit sequence p0[i], p1[j], p2[k], p3[m], and p4[n] containing the values read from the pattern buffer is provided to the decision block to obtain the first bit for code index k4. Additional temporary storage for the 5-bit sequence values p0[i], p1[j], p2[k], p3[m], and p4[n] may be provided but is not necessary if the OVSF bits are being generated on the fly.

Once a first bit has been obtained for each of OVSF code indices k1, k2, k3, and k4, a path_shift signal is asserted to cause a "walking ones" shift in the values in the path buffer. The foregoing process then repeats for the remaining bits for OVSF code indices k1, k2, k3, and k4, until the entire OVSF sequence for OVSF code indices k1, k2, k3, and k4 have been generated. Thus, by time-multiplexing a single OVSF code generator, multiple OVSF codes can be generated at the same time without the use of a plurality of OVSF code generators.

It should be recognized that the process steps of the embodiments described herein may be implemented using many different hardware and/or software devices, and that the hardware configurations described herein are merely exemplary.

While certain embodiments of the present invention disclosed herein relate to 3GPP and UMTS applications, the present invention may have utility in other non-3GPP and non-UMTS contexts, as well.

It should also be recognized that the present invention may be implemented in code generation for despreading in contexts other than OVSF, as well as for descrambling, and that code sequences other than those described herein, consistent with various embodiments of the present invention, are possible.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing steps in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method of generating a code sequence, the method comprising:
   populating at least one buffer with initial values based on a received spreading factor and desired code index;
   receiving a timing strobe;
   changing the values in the at least one buffer upon receipt of the timing strobe based on an algorithm that, without using a counter, generates and stores code sequence values in the at least one buffer; and
   outputting at least one code sequence value based on the values in the at least one buffer.

2. The method of claim 1, wherein the algorithm is a recursive algorithm.

3. The method of claim 1, wherein the initial values stored in the at least one buffer comprise:
   n, wherein n is initialized to the $\log_2$ of the received spreading factor;
   k, wherein k is the desired code pattern number;
   s, wherein s represents the sign of a code sequence element to be generated by the algorithm; and
   c, wherein c is a recursive function call tag indicating the level of recursion in the algorithm.

4. The method of claim 3, wherein, if n is not 0, the algorithm comprises:
   setting n to the previous value of n minus 1;
   setting k to the previous value of k divided by 2; and
   setting c to 0.

5. The invention of claim 4, wherein:
   the at least one buffer is a stack buffer having a stack pointer; and
   the algorithm further comprises, if n is not 0:
      incrementing the stack pointer by 1; and
      storing the changed buffer values in at least one memory location determined by the incremented stack pointer.

6. The method of claim 5, wherein the algorithm further comprises, if n is 0:
   if c is 0, (i) setting c to 1 and, (ii) when the previous value of k is 0, setting s to the inverse of the previous value of s; and
   if c is not 0, decrementing the stack pointer by 1.

7. The method of claim 3, wherein the algorithm further comprises, if n is 0, determining the code sequence value to output based on the current value of s.

8. The method of claim 1, wherein the at least one buffer comprises a desired code register, a pattern buffer, and a path buffer.

9. The method of claim 8, wherein the algorithm comprises populating the desired code register with initial values based on the values of k and n.

10. The method of claim 9, wherein:
k is the desired code sequence index;
SF is the spreading factor; and
the desired code register comprises at least $\log_2(SF)$ memory locations $N[\log_2(SF)-1:0]$; and
further comprising storing initial values in the desired code register such that:
if the number of memory locations is equal to $\log_2(SF)$, then memory locations $[\log_2(SF)-1:0]$ contain a binary representation of k; and
if the number of memory locations is greater than $\log_2(SF)$, then the MSB bits of memory locations $[\log_2(SF)-1:0]$ contain a binary representation of k, and the LSB bits of memory locations $[\log_2(SF)-1:0]$ contain zero values.

11. The method of claim 8, wherein the algorithm comprises populating the pattern buffer by providing values from the desired code register to a look-up table.

12. The method of claim 11, wherein the pattern buffer stores 18 bits comprising a first row of bits b0-b3, a second row of bits b4-b7, a third row of bits b8-b11, a fourth row of bits b12-b15, and a fifth row of bits b16 and b17; and
further comprising initially populating the pattern buffer using a look-up table, the look-up table returning:
the binary values 0000 when provided with the binary values 00;
the binary values 0011 when provided with the binary values 01;
the binary values 0101 when provided with the binary values 10; and
the binary values 0110 when provided with the binary values 11.

13. The method of claim 11, wherein the algorithm comprises retrieving binary values from the look-up table by providing the contents of the desired code register as index values.

14. The method of claim 13, wherein:
SF is the spreading factor;
the desired code register comprises memory locations $N[2(\log_2(SF)):0]$; and
the binary values stored in desired code register memory locations $N[2(\log_2(SF)):2(\log_2(SF))-1]$ are provided as index values to the look-up table to look up content for the first four pattern buffer bits, the binary values stored in desired code register memory locations $N[2(\log_2(SF))-2:2(\log_2(SF))-3]$ are provided as index values to the look-up table to look up content for the next four pattern buffer bits, and so forth, and the binary value stored in desired code register memory location $N[0]$ concatenated with the value "0" are provided as index values to the look-up table to look up content for the last four pattern buffer bits.

15. The method of claim 8, wherein the algorithm comprises shifting the values of the path buffer based on the receipt of the timing strobe.

16. The method of claim 15, wherein the path buffer stores 18 bits comprising a first row of bits b0-b3, a second row of bits b4-b7, a third row of bits b8-b11, a fourth row of bits b12-b15, and a fifth row of bits b16 and b17; and further comprising initially populating the path buffer such that:
the first, second, third, and fourth rows all contains the binary values 1000; and
the fifth row contains the binary values 10.

17. The method of claim 8, wherein the algorithm comprises using the path buffer values to select a plurality of output pattern buffer values.

18. The method of claim 17, wherein the algorithm further comprises performing, at each timing strobe, a "walking ones" operation on the values in the path buffer such that:
the values of the first row shift one bit to the right in a circular manner;
the values of the second row shift one bit to the right only when the values of the first row have shifted back to their initial positions;
the values of the third row shift one bit to the right only when the values of the second row have shifted back to their initial positions;
the values of the fourth row shift one bit to the right only when the values of the third row have shifted back to their initial positions; and
the values of the fifth row shift one bit to the right only when the values of the fourth row have shifted back to their initial positions.

19. The method of claim 17, wherein the algorithm further comprises using the location of a 1 in a row of path buffer contents to select a value in a corresponding row of the pattern buffer.

20. The method of claim 8, wherein the algorithm comprises generating, based on the selected output pattern buffer values, at least one code sequence value.

21. The method of claim 20, wherein the code sequence value is generated by performing an XOR operation on the selected values in a plurality of pattern buffer rows.

22. The method of claim 8, wherein the algorithm is used to generate code sequences for a plurality of code indices in a time-multiplexed fashion.

23. The method of claim 22, wherein the algorithm further comprises:
(a) receiving a plurality of desired code indices;
(b) filling a pattern buffer serially with a pattern from a look-up table corresponding to the first desired code index;
(c) based on the pattern buffer contents and the contents of a path buffer, (i) selecting from the pattern buffer a plurality of values and (ii) obtaining a first code sequence value for the first desired code index;
(d) repeating steps (b) and (c) to obtain a first code sequence value for the remaining desired code indices; and
(e) repeating steps (b) through (d) to obtain at least a second code sequence value for each of the desired code indices.

24. The method of claim 1, wherein the code sequence is an OVSF code sequence.

25. The method of claim 1, wherein the code sequence is a spreading or dispreading code sequence.

26. The method of claim 1, wherein the algorithm generates the code sequence value independent of any count value received.

27. The method of claim 1, wherein the step of changing the values in the at least one buffer comprises changing at least one of the values in at least one of the same buffers in which at least one of the initial values were populated.

28. Apparatus for generating a code sequence, the apparatus comprising:
- means for populating at least one buffer with initial values based on a received spreading factor and desired code index;
- means for receiving a timing strobe;
- means for changing the values in the at least one buffer upon receipt of the timing strobe based on an algorithm that, without using a counter, generates and stores code sequence values in the at least one buffer; and
- means for outputting at least one code sequence value based on the values in the at least one buffer.

29. The apparatus of claim 28, wherein the means for of changing the values in the at least one buffer comprises means for changing at least one of the values in at least one of the same buffers in which at least one of the initial values were populated.

* * * * *